(12) United States Patent
Douglas et al.

(10) Patent No.: US 8,353,615 B2
(45) Date of Patent: Jan. 15, 2013

(54) OPTICALLY COUPLED LIGHT GUIDE

(75) Inventors: David W. Douglas, Austin, TX (US); Jeffrey S. Thelen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 12/552,579

(22) Filed: Sep. 2, 2009

(65) Prior Publication Data

US 2011/0051459 A1 Mar. 3, 2011

(51) Int. Cl.
*F21V 7/04* (2006.01)
(52) U.S. Cl. .................. 362/609; 362/608; 362/610
(58) Field of Classification Search .......... 362/608, 362/610, 621, 622, 612, 562, 318, 609
See application file for complete search history.

(56) References Cited

U.S. PATENT DOCUMENTS

| | | | | |
|---|---|---|---|---|
| RE30,584 E | * | 4/1981 | Russell | 136/246 |
| 5,375,043 A | * | 12/1994 | Tokunaga | 362/601 |
| 6,560,038 B1 | | 5/2003 | Parkyn, Jr. et al. | |
| 6,641,284 B2 | | 11/2003 | Stopa et al. | |
| 6,655,810 B2 | * | 12/2003 | Hayashi et al. | 362/600 |
| 7,270,465 B2 | * | 9/2007 | Keh et al. | 362/621 |
| 7,293,906 B2 | * | 11/2007 | Mok et al. | 362/609 |
| 7,766,536 B2 | * | 8/2010 | Peifer et al. | 362/633 |
| 7,866,874 B2 | * | 1/2011 | Liu et al. | 362/634 |
| 2006/0146569 A1 | * | 7/2006 | Huang et al. | 362/612 |
| 2007/0081360 A1 | * | 4/2007 | Bailey et al. | 362/621 |
| 2008/0198597 A1 | * | 8/2008 | Blumel | 362/247 |
| 2008/0285264 A1 | | 11/2008 | Whitehouse et al. | |
| 2009/0149727 A1 | | 6/2009 | Truitt et al. | |
| 2009/0268124 A1 | * | 10/2009 | Kujiraoka et al. | 349/61 |
| 2009/0316064 A1 | * | 12/2009 | Kono et al. | 349/58 |
| 2010/0002465 A1 | * | 1/2010 | Tsang et al. | 362/612 |

* cited by examiner

*Primary Examiner* — David Crowe
(74) *Attorney, Agent, or Firm* — Haynes and Boone, LLP

(57) ABSTRACT

An optically coupled light guide includes a light source having a surface defined by a channel, a light guide and an optical gel coupling the channel of the light source to the light guide.

14 Claims, 5 Drawing Sheets

OPTICALLY COUPLED LIGHT GUIDE

BACKGROUND

The present disclosure relates generally to information handling systems (IHSs), and more particularly to an IHS display device having an optically coupled light guide system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A user generally operates an IHS using a variety of interface devices, such as a display device, a keyboard, a mouse pointer and/or a variety of other user input devices. Many display devices, such as liquid crystal display (LCD) devices, operate using a light transmissive technology that transmits or blocks light that is provided by a backlight device, such as a light emitting diode (LED). Light is transmitted from the light source and distributed to the LCD using a light guide and a diffuser. If the light source fails, traditional backlight systems generally require replacement of the light source at a factory or at a field service center to properly align the light source with the light guide. Improper alignment of the light source with the light guide causes light leakage and reflections between the LED and light guide and thus, reduced light for the display device.

Accordingly, it is desirable to provide an improved display device having an optically coupled light guide system.

SUMMARY

According to one embodiment, an optically coupled light guide includes a light source having a surface defined by a channel, a light guide and an optical gel coupling the channel of the light source to the light guide.

DETAILED DESCRIPTION

For purposes of this disclosure, an information handling system (IHS) 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
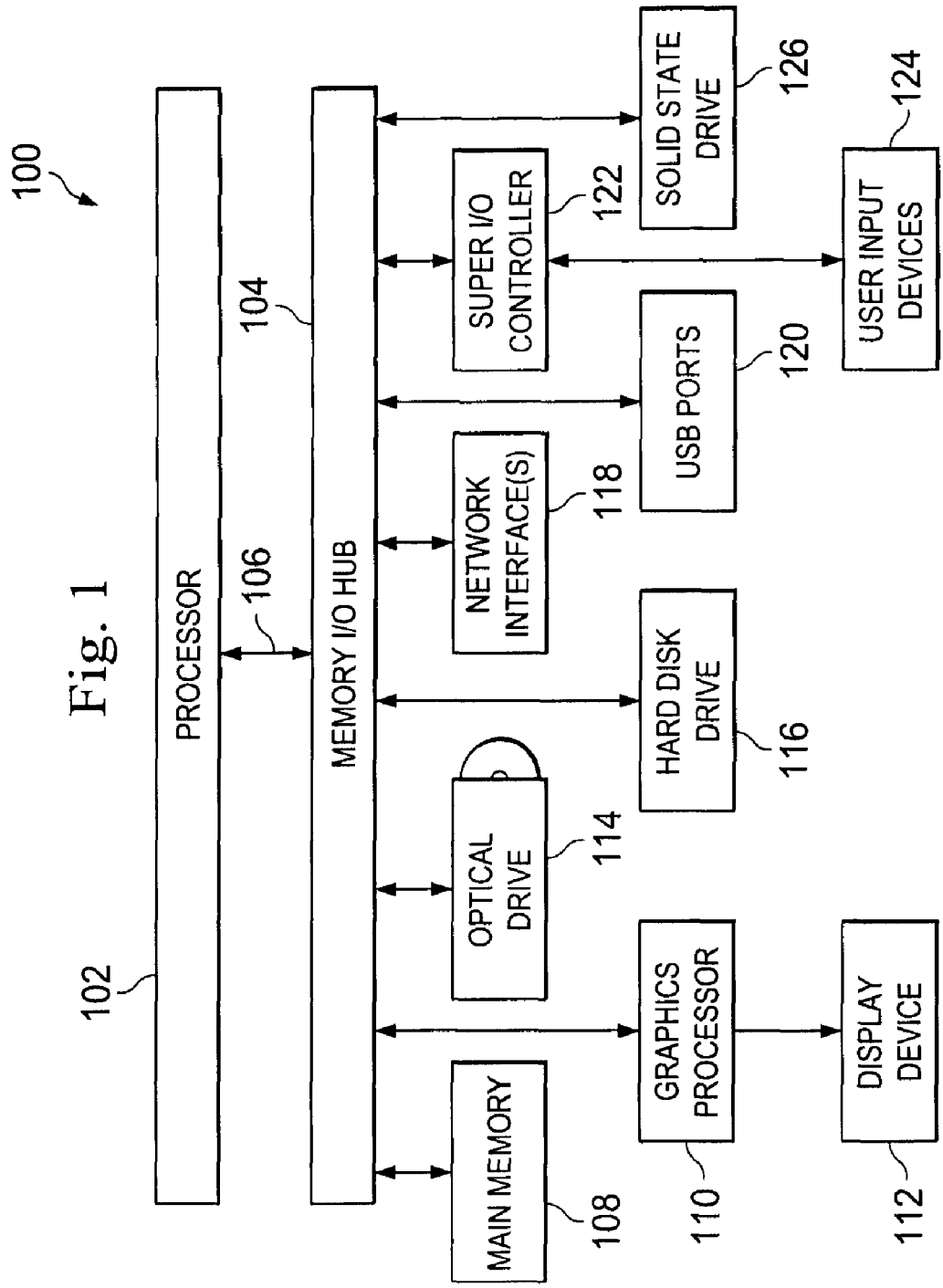
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112. The display device 112 may be a liquid crystal display (LCD) device, a plasma display device or any other type of display device.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure provides light guide optically coupled to a light source for a display device (e.g., the display device 112, a television display device, or any other display device). In an embodiment, a light source array is optically coupled to the light guide as a field replaceable system. A non-curing, index matched synthetic optical gel is used to optically couple the light source array to the light guide without the need for a clean room environment. The light source (e.g., a light emitting diode (LED)) includes a surface having a larger surface area than the coupled portion of the light guide, so that a majority of the gel is removed from the light guide when the light source array is removed. Thus, a user can replace the light source array without special alignment tools because the optical gel provides a medium for substantially all of the light emitted by the light source to be transmitted to the light guide. In other words, a replacement light source array is mechanically aligned with the light guide using the optical gel to provide a coupling between the light sources on the light source array and the light guide. The geometric shape of the light source surface may have a serrated and/or channeled surface to propagate columinated light photons in the light source to the light guide.

Figure 2:
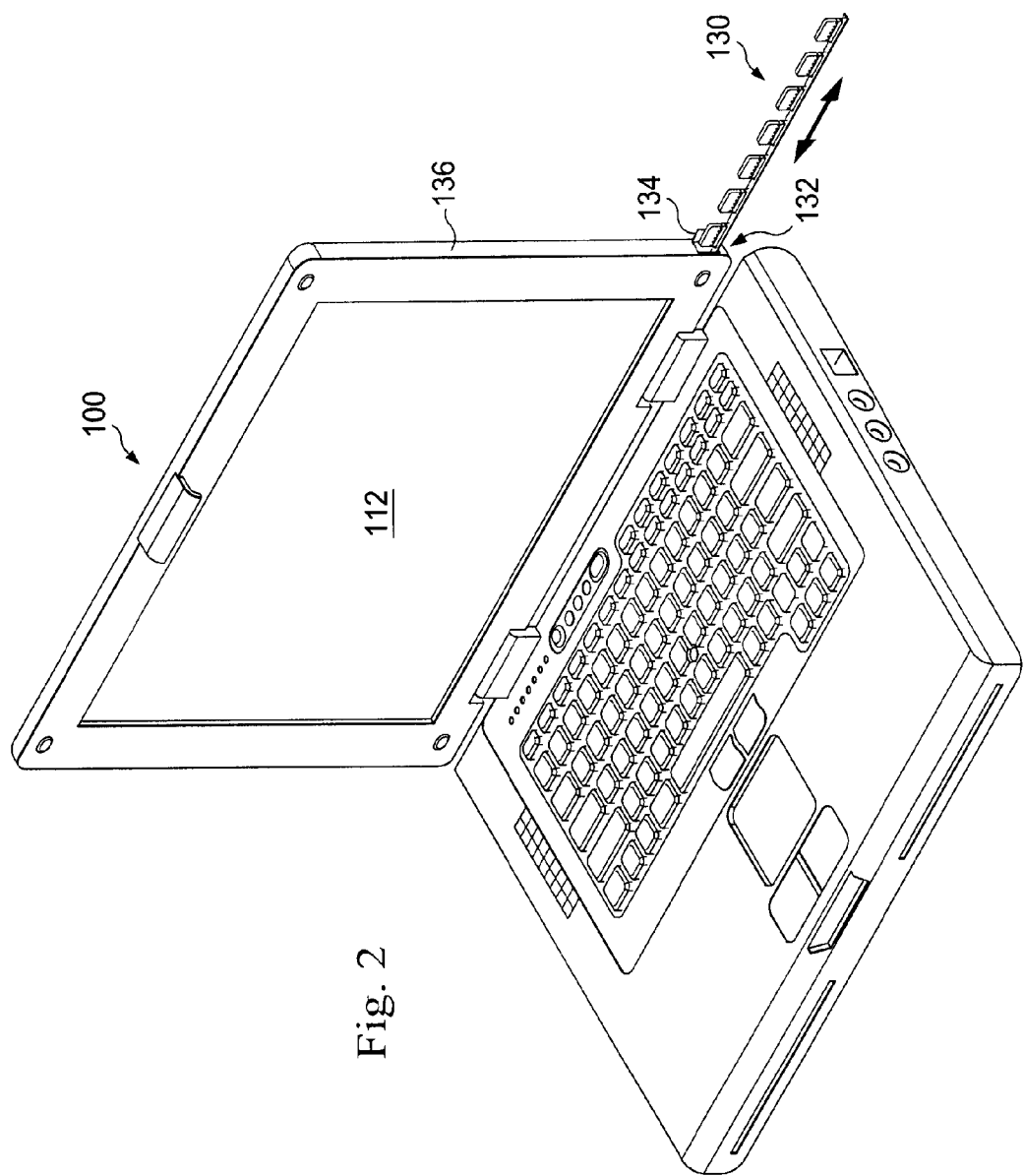
FIG. 2 illustrates the IHS of FIG. 1 with an embodiment of a field replaceable backlight system.

FIG. 2 illustrates the IHS 100 with a field replaceable backlight system. A light source array 130 provides a light source for the display device 112. The display device 112 is a light transmissive-type display device. LCD devices and electro-whetting devices are examples of light transmissive-type display devices that transmit or block patterns of light provided through the light guide by the light source to form an image on a viewing surface of the display device 112. It is contemplated that the display device 112 may include one or more polarizers, color filters, thin film transistors and/or a variety of other devices that are not shown to form the light transmissive display device 112.

The IHS 100 includes a channel 132 for slideably receiving the light source array 130 and positioning it in proper alignment below the display device 112 so that light provided by the light source array 130 is transmitted through a light guide to the viewing surface of the display device 112. The light source array 130 is electrically coupled to the IHS 100 to power the light sources. The chassis 136 of the IHS 100 includes a door 134, to allow access to the channel 132 for removing, inserting and aligning the light source array 130.

Figure 3:
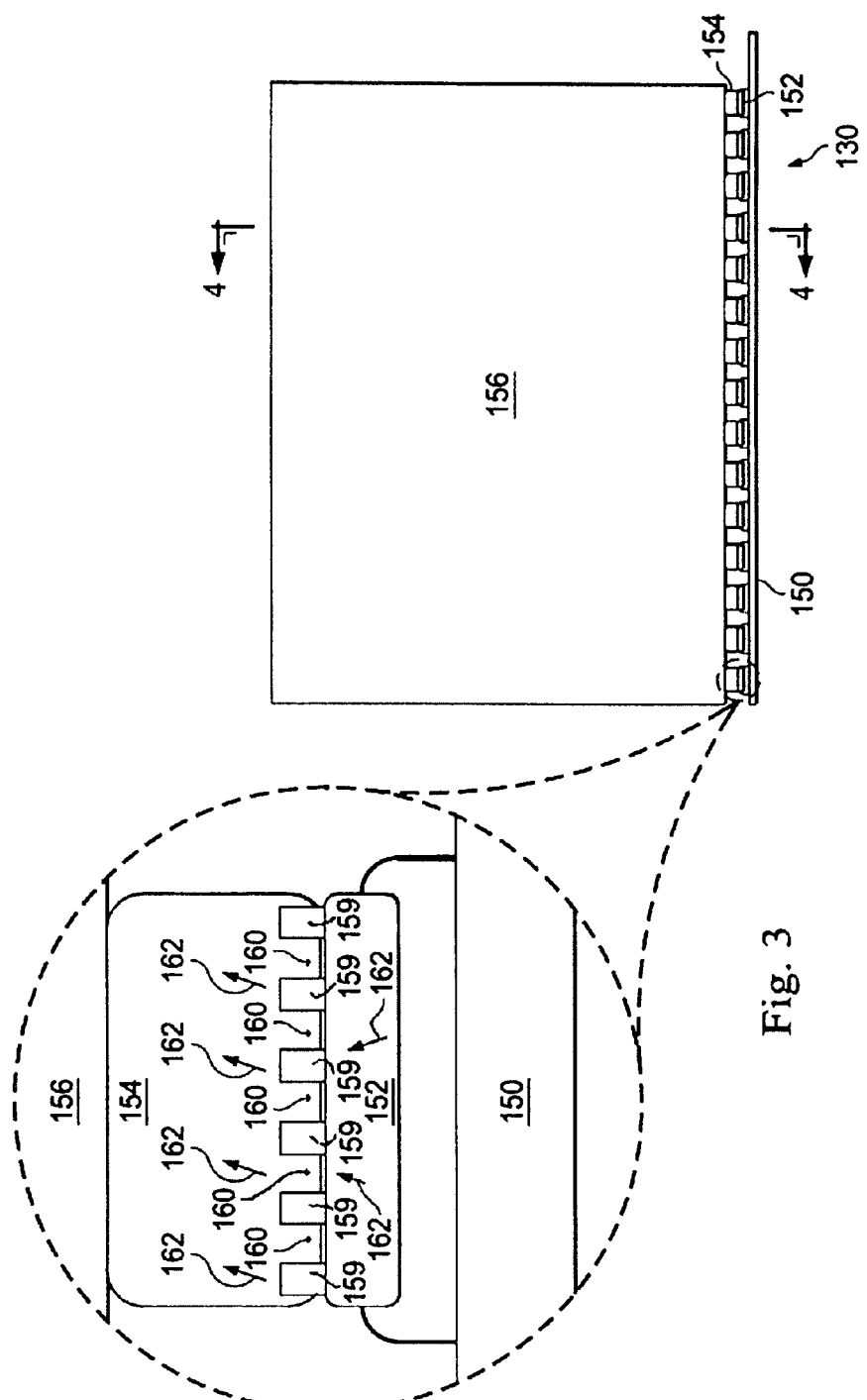
FIG. 3 illustrates the field replaceable backlight system of FIG. 2 optically coupled to a light guide.
Figure 4:
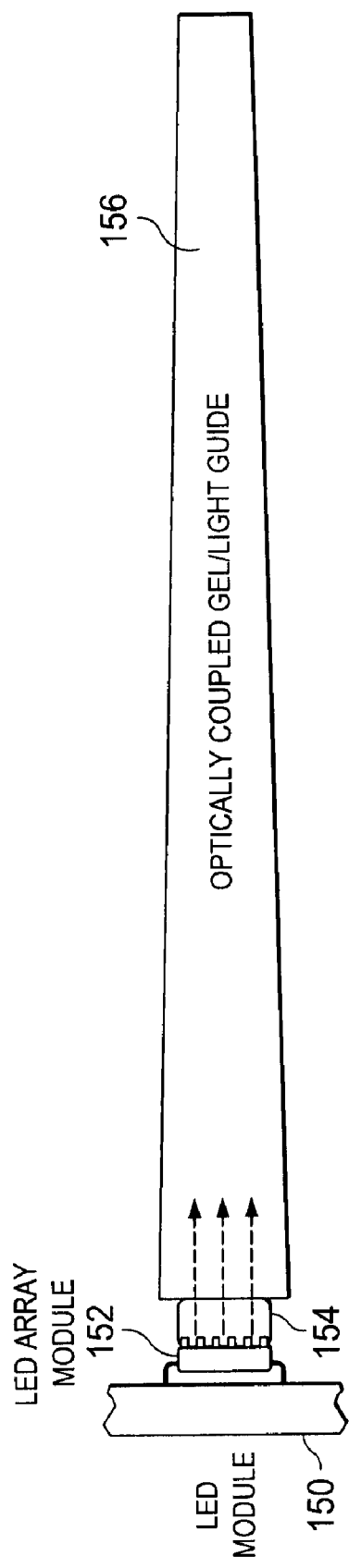
FIG. 4 illustrates a sectional view of the field replaceable backlight system as viewed along line 4-4 of FIG. 3.

FIG. 3 illustrates the field replaceable backlight system including the light source array 130. FIG. 4 illustrates a sectional view of the field replaceable backlight system as viewed along line 4-4 of FIG. 3. A frame 150 supports and aligns a plurality of light sources 152 on the array 130. The light sources 152 may be any light emitting devices, such as a LEDs. In the alternative, fluorescent, incandescent or other types of light sources may be used on the array 130. Additionally, the array 130 may include any number of light sources 152. Furthermore, the array 130 may be positioned above, below, behind or to either side of the display device 112.

An optical gel 154 couples the light sources 152 to a light guide 156. In FIGS. 2-4, the light guide 156 is positioned above the array 130 and behind the viewing surface of the display device 112. The light guide 156 transmits light emitted from the light sources 152 and reflects the light along a surface of the light guide 156 to project the light toward the viewing surface of the display device 112. The light guide 156 is made from a material having a high light transmissitivity and a low light refraction index. The optical gel 154 is matched with the light guide 156 to have a substantially similar refractive index, such as having a refractive index value within 1 unit of each other. The refractive index is a measure of how much the speed of light is reduced while traveling through the medium, with respect to the speed of light traveling through a vacuum. The optical gel 154 receives light from the light sources 152 and transmits it to the light guide 156 with little or no reflection of the light so that substantially all of the light emitted by the light sources 152 in the direction of the light guide 156 is transmitted to the light guide 156. In turn, the display device 112 displays a brighter image per unit of power consumed by the array 130. The optical gel 154 is a gel agent including one or more aliphatic hydrocarbons to match the refraction index of the light sources 152 with the light guide 156. In the alternative, optical gel materials other than aliphatic hydrocarbons may be used in the optical gel 154.

The light sources 152 are constructed having a glass, plastic, polymer, or other covering over the light emitting filament. There may be any number of light sources 152 on the array 130. The covering of the light sources 152 may also be matched to the optical gel 154 and the light guide 156 to have similar refractive indexes so that a maximum amount of light is transmitted from the light sources 152 to the light guide 156 having as little reflection as possible.

The surface of the light sources 152 includes a plurality of rectangular optical gel coupling members 159 that extend from each light source 152 in a spaced apart orientation from each other and into the optical gel to define one or more channels 160. The rectangular optical gel coupling members 159 and the channels 160 defined between them provide a surface for the optical gel 154 to stick to. The rectangular optical gel coupling members 159 provide the light sources 152 with a relatively larger surface area that contact the optical gel 154 so that the gel 154 is more likely to stick to the array 130 than to a relatively smooth surface of the light guide 156 when the array 130 is removed. Additionally, the side surfaces of the rectangular optical gel coupling members 159 that define the channels 160 provide a surface to columnate and direct light 162 toward the light guide 156. In other words, light 162 that is emitted radially in the light source 152 is reflected along the side surfaces of the rectangular optical gel coupling members 159 that define the channels 160 and toward the light guide 156. As such, substantially all light emitted by the light sources 152 is captured and transmitted through the gel 154 and the light guide 156 toward the viewing surface of the display device 112.

Figure 5A:
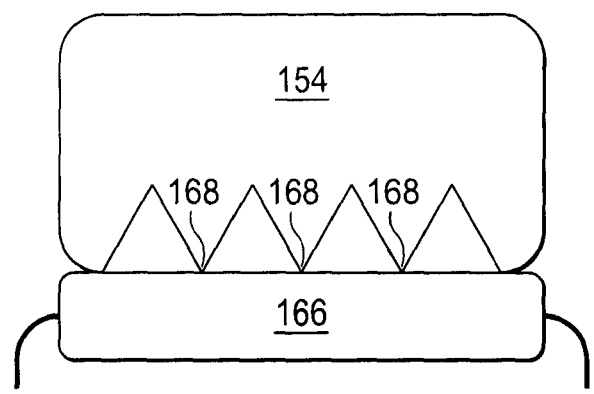
FIG. 5 illustrates alternative embodiments of light source configurations and optical coupling for the light guide system of FIGS. 2-4.
Figure 5B:
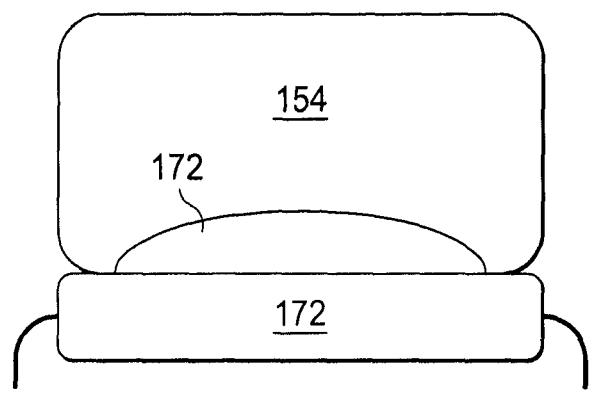
Figure 5C:
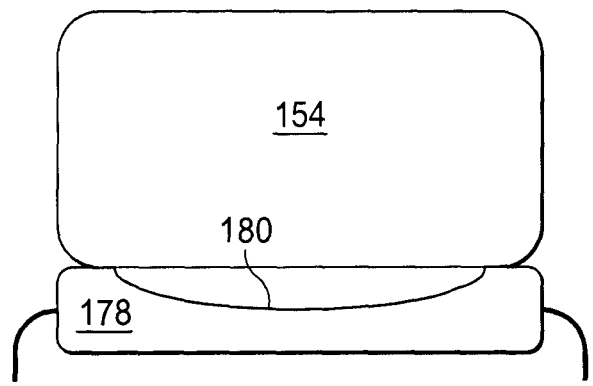

FIG. 5 illustrates alternative embodiments of light source configurations coupled to the light guide 156 using the gel 154. Light source 166 is an LED having channels 168 formed as v-shaped channels. Light source 172 is an LED having a convex/inverse channel 174. Light source 178 is an LED having a concave channel 180. It is contemplated that any number and any shape of channels may be used for the light sources.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display device, comprising:
a display chassis defining a light source array channel and housing a light guide that is located adjacent the light source array channel; and
a light source array including a frame, at least one light source coupled to the frame and an optical gel coupled to the at least one light source, wherein the at least one light source includes a light source surface having a plurality of rectangular optical gel coupling members that extend into the optical gel in a spaced apart orientation from each other and on either side of a portion of the light source such that at least one channel is defined between the rectangular optical gel coupling members, a portion of the optical gel is located in the at least one channel, and the sides of the rectangular optical gel coupling members that define each channel reflect light emitted from the portion of the light source toward the light guide;

wherein the light source array is operable to be moved into the light source array channel to engage the frame with the display chassis and engage the optical gel with the light guide such that the optical gel is operable to channel light from the at least one light source to the light guide.

2. The device of claim 1, further comprising:

a door coupled to the display chassis and positioned adjacent a channel entrance of the light source array channel, wherein the door provides access for the light source array to move into the light source array channel.

3. The device of claim 2, wherein the door provides access for the light source array to move into and out of the light source array channel without any disassembly of the display chassis.

4. The device of claim 1, wherein the optical gel is dimensioned such that the light source array is moveable through the light source channel, and the optical gel engages the light guide when the light source array is positioned in the light source channel.

5. The device of claim 1, wherein the light guide includes a light guide surface area that engages the optical gel when the light source array is moved in and out of the light source array channel, and wherein the light source surface and the light guide surface area are provided to allow relative movement between the light guide and the optical gel without detachment of the optical gel from the at least one light source.

6. An information handling system (IHS) comprising:

a processor;

a memory coupled to the processor; and a display device coupled to the processor, the display device including:

a display chassis defining a light source array channel, a channel entrance that provides access to the light source array channel, and housing a light guide that is located adjacent the light source array channel; and a light source array including a frame, at least one light source coupled to the frame and an optical gel coupled to the at least one light source, wherein the at least one light source includes a plurality of rectangular optical gel coupling members that extend into the optical gel in a spaced apart orientation from each other and on either side of a portion of the light source such that at least one channel is defined between the rectangular optical gel coupling members, a portion of the optical gel is located in the at least one channel, and the sides of the rectangular optical gel coupling members that define each channel reflect light from the portion of the light source toward the light guide;

wherein the light source array is operable to be moved into the light source array channel through the channel entrance to engage the optical gel with the light guide such that the optical gel is operable to channel light from the at least one light source to the light guide.

7. The IHS of claim 6, further comprising:

a door coupled to the display chassis and positioned adjacent the channel entrance, wherein the door provides access for the light source array to move into the light source array channel.

8. The IHS of claim 7, wherein the door provides access for the light source array to move into and out of the light source array channel without any disassembly of the display chassis.

9. The IHS of claim 6, wherein the optical gel is dimensioned such that the light source array is moveable through the light source channel, and the optical gel engages the light guide when the light source array is positioned in the light source channel.

10. The IHS of claim 6, wherein the light guide includes a light guide surface area that engages the optical gel when the light source array is moved in and out of the light source array channel, and wherein the rectangular optical gel coupling members and the light guide surface area are provided to allow relative movement between the light guide and the optical gel without detachment of the optical gel from the at least one light source.

11. A method of coupling a light source to a light guide, the method comprising;

providing a light source array including a frame, at least one light source coupled to the frame, and an optical gel coupled to the at least one light source, wherein a plurality of rectangular optical gel coupling members extend from a light source surface and into the optical gel in a spaced apart orientation from each other and on either side of a portion of the light source such that at least one channel is defined between the rectangular optical gel coupling members, a portion of the optical gel is located in the at least one channel, and the sides of the rectangular optical gel coupling members that define each channel are operable to reflect light from the portion of the light source toward a light guide;

moving the light source array through a channel entrance defined by a device chassis such that the light source array enters a light source array channel defined by the display device and the frame engages the device chassis;

engaging the light guide located in the device chassis with the optical gel when the light source array is positioned in the light source array channel, wherein the engagement of the rectangular optical gel coupling members and the optical gel prevents detachment of the optical gel from the at least one light source; and transmitting light from the light source to the light guide through the optical gel.

12. The method of claim 11, further comprising:

opening a door that is coupled to the device chassis and located adjacent the channel entrance such that the light source array may move through the channel entrance and enter the light source array channel.

13. The method of claim 11, further comprising:

opening a door that is coupled to the device chassis and located adjacent the channel entrance such that the light source array may move into and out of the light source array channel without any disassembly of the device chassis.

14. The method of claim 11, wherein the rectangular optical gel coupling members are dimensioned such that the at least one channel is rectangle shaped.

* * * * *